United States Patent
Chen et al.

[11] Patent Number: 6,023,840
[45] Date of Patent: Feb. 15, 2000

[54] METHOD OF MANUFACTURING A THIN FILM MAGNETIC HEAD HAVING AN ULTRATHIN SILICON WEAR COATING

[75] Inventors: Pei C. Chen, Cupertino; Grace Lim Gorman, San Jose; Cherngye Hwang, San Jose; Vedantham Raman, San Jose; Randall George Simmons, San Jose, all of Calif.

[73] Assignee: International Business Machines Corporation, Armonk, N.Y.

[21] Appl. No.: 09/144,000

[22] Filed: Aug. 31, 1998

Related U.S. Application Data

[62] Division of application No. 08/607,892, Feb. 27, 1996, Pat. No. 5,808,832.

[51] Int. Cl.[7] .................................................... G11B 5/42
[52] U.S. Cl. ................................ 29/603.12; 29/603.14; 360/103; 360/122
[58] Field of Search .......................... 29/603.12, 603.14; 360/103, 122

[56] References Cited

U.S. PATENT DOCUMENTS

| | | | |
|---|---|---|---|
| 4,768,121 | 8/1988 | Nakashima et al. | 360/125 |
| 4,809,103 | 2/1989 | Lazzari | 360/103 |
| 5,055,958 | 10/1991 | Yagami et al. | 360/122 |
| 5,136,775 | 8/1992 | Onoe et al. | 29/603 |
| 5,175,658 | 12/1992 | Chang et al. | 360/103 |
| 5,323,283 | 6/1994 | Sano | 360/103 |
| 5,336,550 | 8/1994 | Ganapathi | 360/103 |

*Primary Examiner*—Carl E. Hall
*Attorney, Agent, or Firm*—Gray Cary Ware & Freidenrich LLP; Ervin F. Johnston

[57] ABSTRACT

A single layer wear coating is provided for a magnetic head assembly. The single layer is silicon or silicon-based material with a thickness in the range of 30–75 Å. The single layer may be formed by a single step of deposition employing a DC magnetron. The single layer wear coating improves the wear performance of the magnetic head assembly and protects one or more sensitive elements of a magnetic head without significant reduction of spacing loss.

8 Claims, 6 Drawing Sheets

METHOD OF MANUFACTURING A THIN FILM MAGNETIC HEAD HAVING AN ULTRATHIN SILICON WEAR COATING

This application is a divisional application of Ser. No. 08/607,892, filed Feb. 27, 1996, now U.S. Pat. No. 5,808,832.

CROSS REFERENCE TO RELATED PATENT

This invention is an improvement of commonly assigned U.S. Pat. No. 5,175,658 which is incorporated by reference herein.

BACKGROUND OF THE INVENTION

1. Field of the Invention

The invention relates to a wear coating for a magnetic head and more particularly to a single thin film silicon based wear coating which is comparable to multi-layer thin film wear coatings.

2. Description of the Related Art

A magnetic head is employed in a disk drive for reading and writing information in tracks on the surface of a rotating disk. The magnetic head is provided in (or, on) a slider which is, in turn, mounted on a suspension. The suspension is mounted on an actuator which positions the magnetic head at tracks on the magnetic disk. As the disk rotates, an air cushion is generated between the rotating disk and an air bearing surface (ABS) of the slider. A loading force of the suspension counterbalances the force of the air cushion, causing the magnetic head to be spaced a slight distance from the surface of the disk, on the order of 0.075 µm, as the disk rotates. The smaller the spacing, the greater the areal density achievable with the magnetic head. Areal density is the number of bits that the magnetic head can read per square inch of the disk's surface.

Manifestly, head-to-disk spacing imposes a limit on areal density for any particular head. The difference between the areal density that would be theoretically achievable if the head contacted the disk surface and the areal density achievable at any head-to-disk spacing represents a loss in data storage capability that is referred to as "spacing loss". Of course, a head which makes contact with the surface of the disk has no spacing loss. Such contact, however, would result in unacceptable wear of the head.

Spacing loss is also caused by a wear coating which may be applied to the ABS of a head to protect sensitive elements of the head. For example, a combined head may include an inductive write head portion and an MR read head portion. The sensitive element of the write head portion includes a pair of pole tips which are separated by a gap, and the sensitive element of a read head portion includes an MR sensor. During take off and landing of the slider, contact with the disk surface can abrade the sensitive elements of a combined magnetic head. Wear of the sensitive elements shortens them, causing degradation of head performance. Accordingly, an art has developed which provides wear coatings for magnetic heads. A strong felt need in this art is to keep the wear coating as thin as possible so as to minimize spacing loss.

In commonly assigned U.S. Pat. No. 5,175,658 tri-layer wear coating is described. The first layer, which covers the rails of a slider and the sensitive element of a magnetic head mounted thereon, is a 10–50 Å thick adhesion layer of silicon. The next layer is a 50–1000 Å thick layer of amorphous hydrogenated carbon. The final layer, which forms the ABS of the slider, is a 50 Å thick layer of silicon. An alternative protective coatmg employed by the assignee comprises two layers: a 10 Å thick adhesion layer of silicon and a final 35 Å thick layer of amorphous hydrogenated carbon.

Formation of these wear coatings requires a sputtering step for each layer. Thus, the three-layer coating of the '658 patent requires three sputtering steps, while the two-layer coating requires two. It can well be appreciated that each sputtering step incrementally increases the cost of manufacturing. It would be desirable if the wear coating could be applied in one sputtering step. U.S. Pat. No. 5,323,283 employs a single layer wear coating which is applied in one sputtering step. The single layer wear coating is a 175–225 Å thick layer of silicon dioxide. It would be desirable if the thicknesses of this single layer could be reduced as far as possible so as to minimize spacing loss. Accordingly, there is a strong felt need for a single layer wear coating which provides an ideal minimum spacing loss over state of the art wear coatings.

SUMMARY OF THE INVENTION

We have discovered that a wear coating consisting of a single 30–75 Å thick layer of silicon-based material provides comparable results with that of the aforementioned 45 Å thick two-layer wear coating. Since the thicknesses are comparable, the spacing loss is comparable. Tests were conducted to determine stiction versus thousands of contact start and stop (CSS) cycles of a single layer wear coating of silicon as compared to the two-layer wear coating. During each CSS cycle the slider takes off and lands on the disk. During take off, friction between the ABS and the disk is referred to as stiction and is greater than the friction upon landing. It is important after many CSS cycles that stiction remain relatively constant. Seven tests were conducted with the present single silicon layer wear coating and four tests were conducted with the two-layer wear coating. After 20,000 CSS cycles, the stictions of the single silicon layer wear coating and the two-layer wear coating were essentially equal. Accordingly, substantially the same wear performance can now be achieved with a single layer deposition as that obtained with a double layer deposition without any significant impact on spacing loss.

An object of the present invention is to provide a highly functional, low cost wear coating for a slider.

A further object is to provide a simpler method of making a wear coating for a slider without increasing spacing loss.

Other objects and attendant advantages of the present invention will become apparent upon reading the following description taken together with the accompanying drawings.

DESCRIPTION OF THE PREFERRED EMBODIMENT

Figure 1:
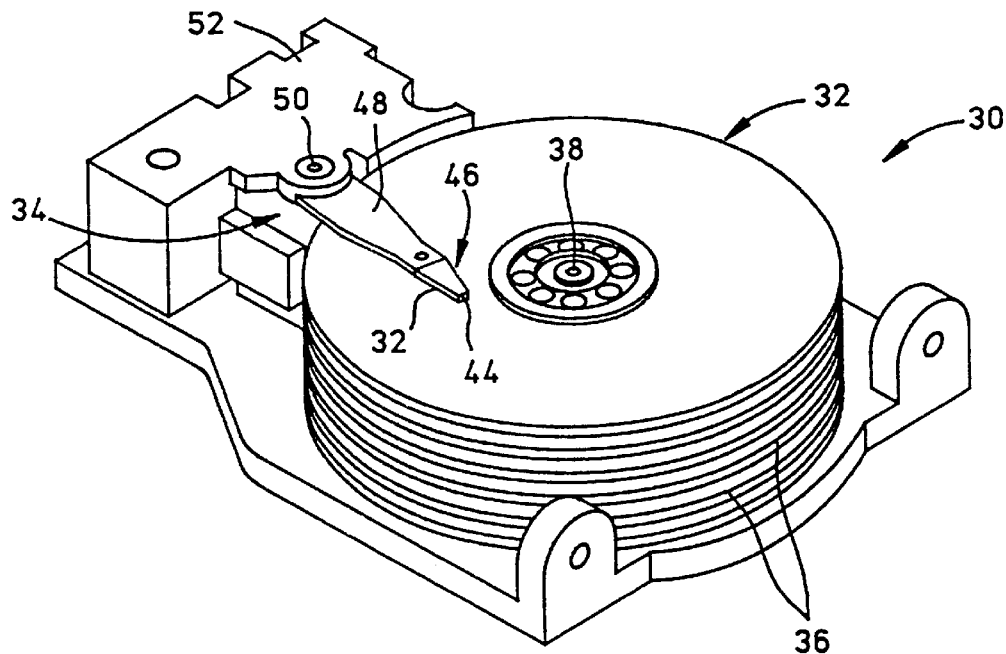
FIG. 1 is an isometric illustration of a typical magnetic disk drive.
Figure 2:
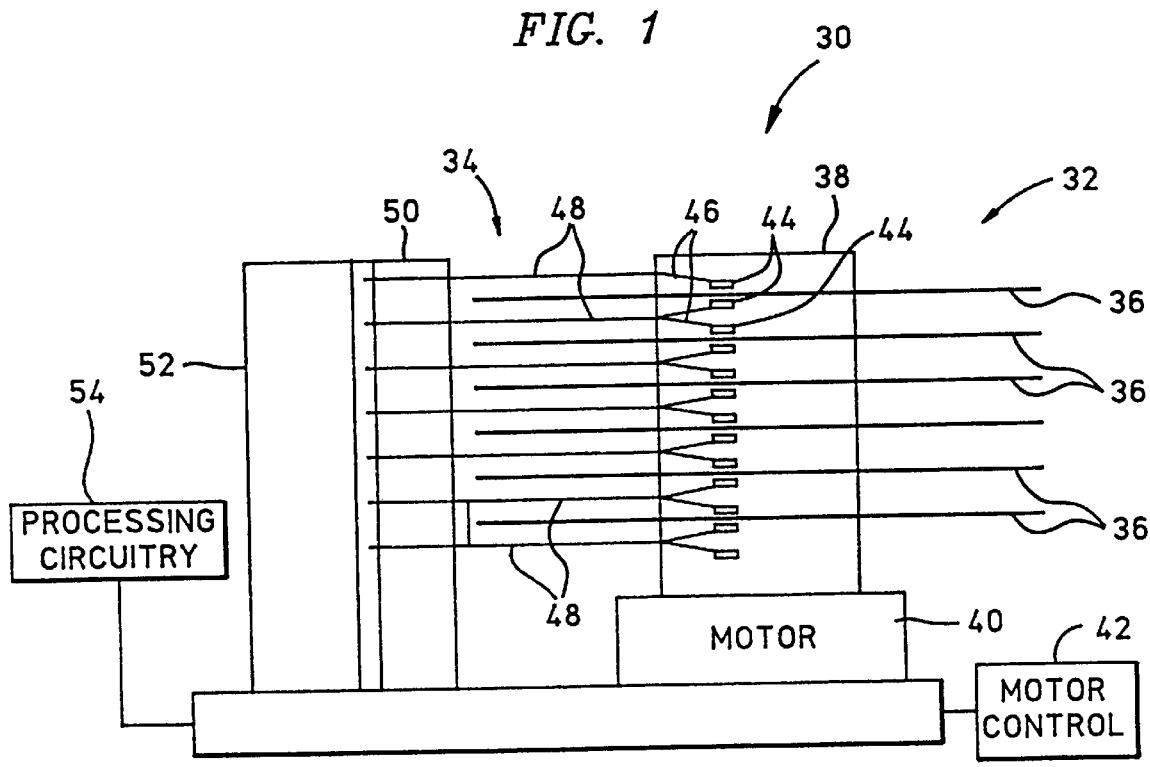
FIG. 2 is a side view of the magnetic disk drive illustrated in FIG. 1.

Referring now to the drawings wherein like reference numerals designate like or similar parts, throughout the several views there is illustrated in FIGS. 1 and 2 a magnetic disk drive 30 which includes a disk stack assembly 32 and a head stack assembly 34. The disk stack assembly 32 includes a plurality of double-sided magnetic disks 36 which are mounted on a spindle 38. The spindle 38 is rotated by a motor 40 which is controlled by a motor control 42. The head stack assembly 34 includes a plurality of magnetic head assemblies 44, each magnetic head assembly being mounted on a respective suspension 46. The suspensions 46 are mounted to actuator arms 48 which are, in turn, mounted to an actuator spindle 50. The actuator spindle 50 is rotated by a voice coil motor 52 which is controlled by processing circuitry 54. The processing circuitry 54 causes the magnetic head assemblies 44 to be rotated to predetermined circular information tracks on the disks 32. The processing circuitry 54 also transmits information signals to the magnetic head assemblies 44 when the magnetic head assemblies are writing information to the circular tracks and receives information from the magnetic head assemblies when the magnetic head assemblies are reading information signals from the circular tracks.

When the disks 36 are stationary, each suspension 46 biases a respective magnetic head assembly 44 into contact with the surface of a respective disk 36.

When the disks 36 are rotated the biasing force is counterbalanced by the force of a thin cushion of air—an air bearing—which supports the air bearing surface (ABS) of each magnetic head assembly a short distance from the disk, in the order of 0.075 gm. This spacing is necessary to prevent unacceptable wear of the magnetic head assembly. It should be understood that the greater the spacing, the lower the bit density of the head. Accordingly, it is desirable to keep the spacing as low as possible in order to minimize spacing loss. Another contributor to spacing loss, however, is a wear coating which covers the magnetic head assembly and forms the ABS.

Figure 3:
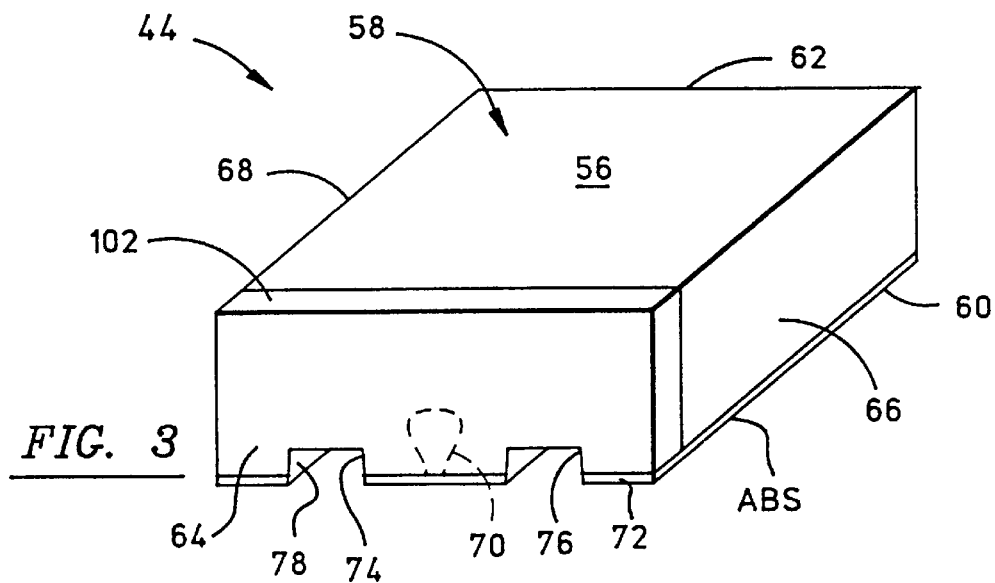
FIG. 3 is an isometric illustration of a slider which has the present single layer wear coating.
Figure 4:
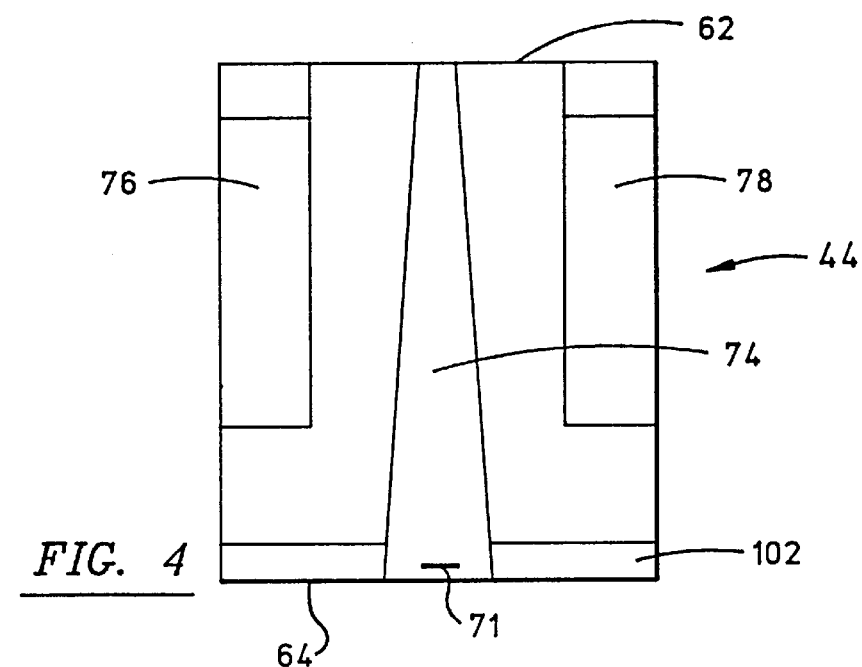
FIG. 4 is an ABS view of FIG. 3.
Figure 5:
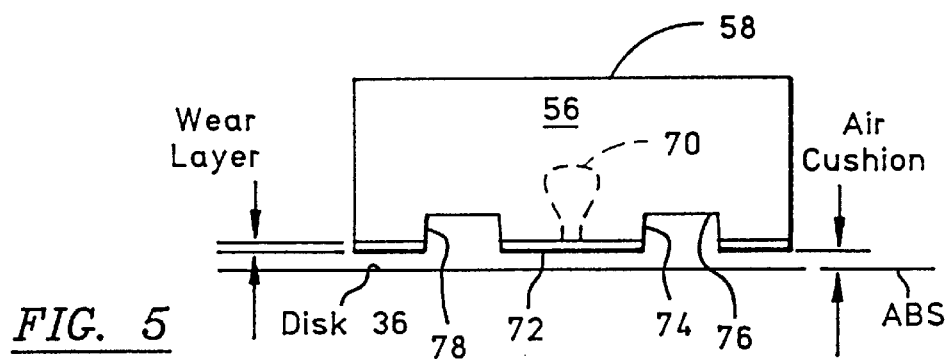
FIG. 5 is a trailing edge view of FIG. 3.

FIGS. 3, 4 and 5 illustrate the magnetic head assembly 44 of this invention, which includes an ultrathin wear coating that insignificantly contributes to spacing loss. As shown in FIG. 3, the magnetic head assembly 44 includes a slider 56 which has first and second surfaces 58 and 60, each bounded by leading and trailing edges 62 and 64 and first and second sides 66 and 68. The surface 60 forms the ABS which is supported on the aforementioned air cushion. A magnetic head 70 has a sensitive element 71 located near the trailing edge 64 and exposed at the ABS. As stated in the Background, the magnetic head 70 may have more than one sensitive element.

It is important that the one or more sensitive elements of a magnetic head be covered with a wear coating 72 to prevent wear. When a sensitive element is worn, it shortens, which can cause unacceptable changes in its transfer function. Another reason for providing a wear coating is to protect the sensitive element from corrosion. The wear coating covers the first surface 60 of the slider, providing an air bearing surface with good wear properties.

The wear coating 72 is an ultra-thin layer of silicon based material. We have discovered that a single pure silicon layer with a thickness in the range of 30–75 Å has comparable performance with that of the aforementioned bi-layer wear coating. Comparative tests will be discussed in detail hereinafter.

The portion of a slider that faces a disk is typically patterned as illustrated in FIG. 4 to provide a center rail 74 between a pair of taper-flat side rails 76 and 78. The sensitive element 71 of the magnetic head 70 is located near the trailing edge of the center rail 74. It should be understood that there are many such patterns. For instance, an island may be employed instead of a center rail for mounting the magnetic head at the trailing edge 64. Further, the side rails 76 and 78 may extend to the trailing edge of the slider where a pair of magnetic heads may be mounted. Nevertheless, for the pattern illustrated in FIG. 4, the aforementioned wear coating 72 covers the surface of the center rail 74 and the sensitive element 71 and the surfaces of the side rails 76 and 78 to provide the ABS of the slider with good wear properties and to protect the sensitive element 71. FIG. 5 illustrates the slider 56 supported on an air bearing above the surface of the magnetic disk 36. Spacing loss is compounded of the thickness of the air bearing (fly height) and the thickness of the wear coating 72. The present invention provides a minimum thickness wear coating 72 which can be formed in one deposition step.

Figure 6:
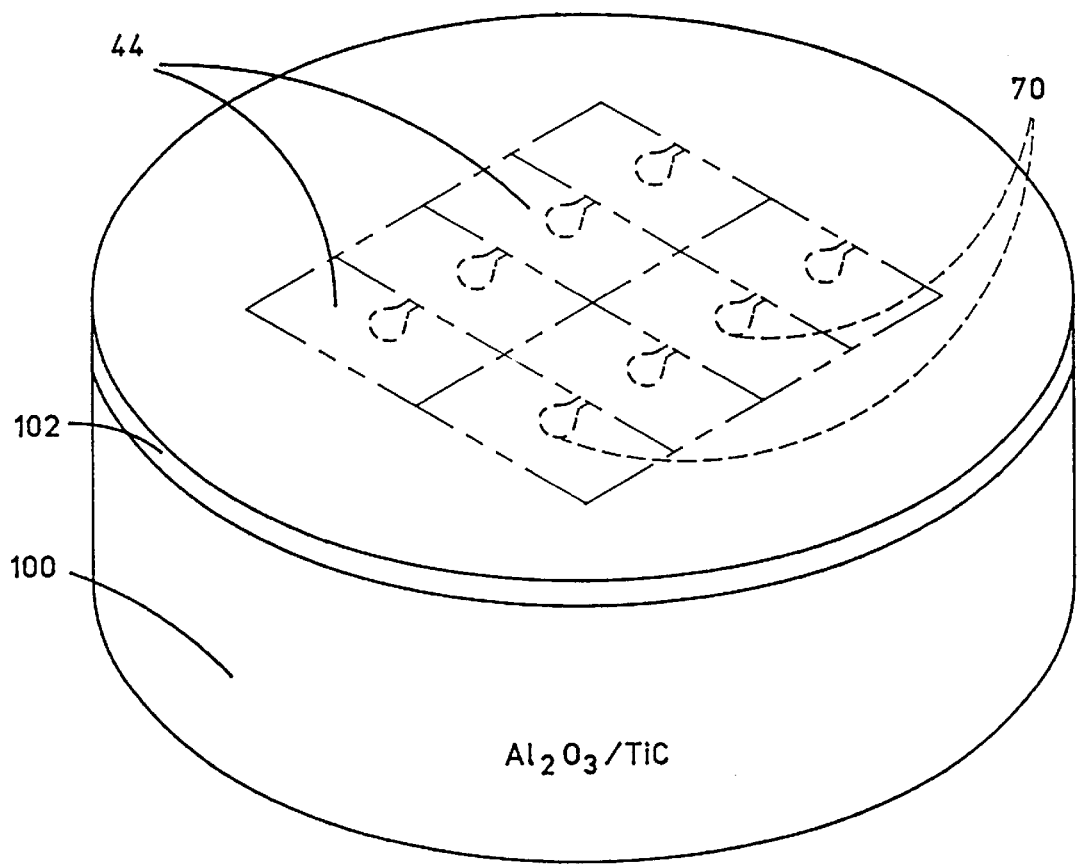
FIG. 6 is an isometric illustration of the construction of rows and columns of magnetic head assemblies at the wafer level.
Figure 7:
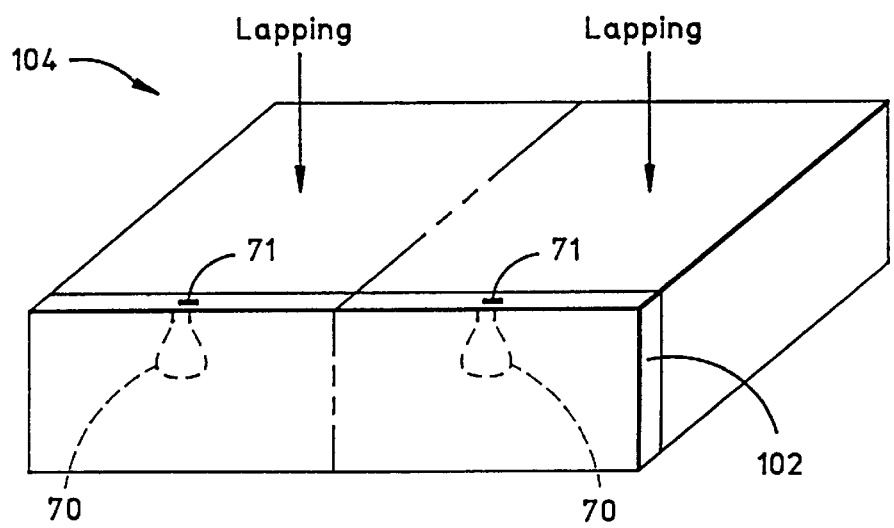
FIG. 7 is an isometric illustration of the magnetic head assemblies at the row level, the row having been cut from the wafer shown in FIG. 3.
Figure 8:
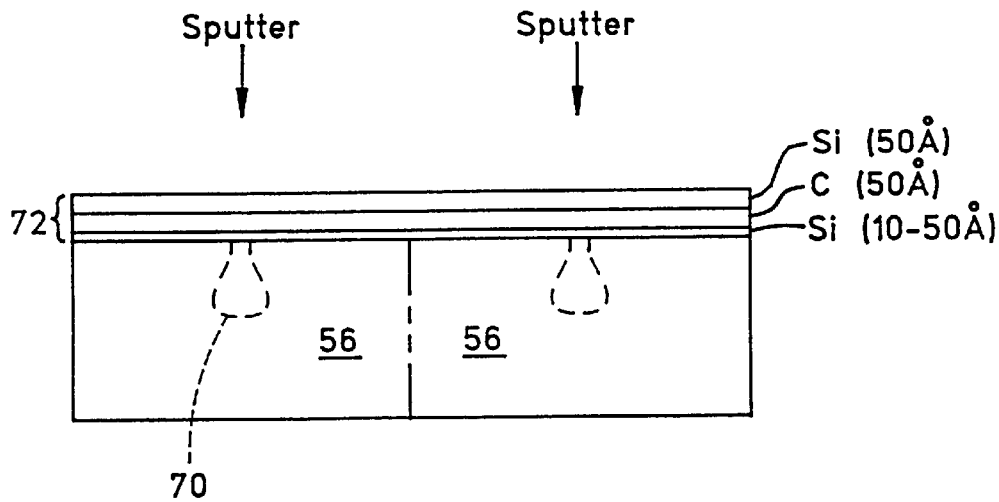
FIG. 8 is a trailing edge view of a row of magnetic head assemblies showing formation of a prior art tri-layer wear coating.
Figure 9:
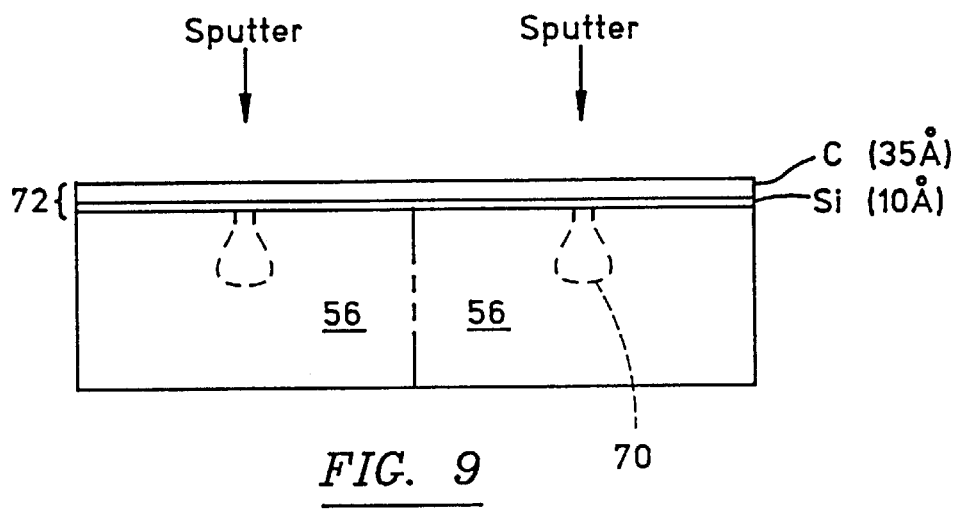
FIG. 9 is similar to FIG. 8, except it illustrates the formation of a bi-layer wear coating.
Figure 10:
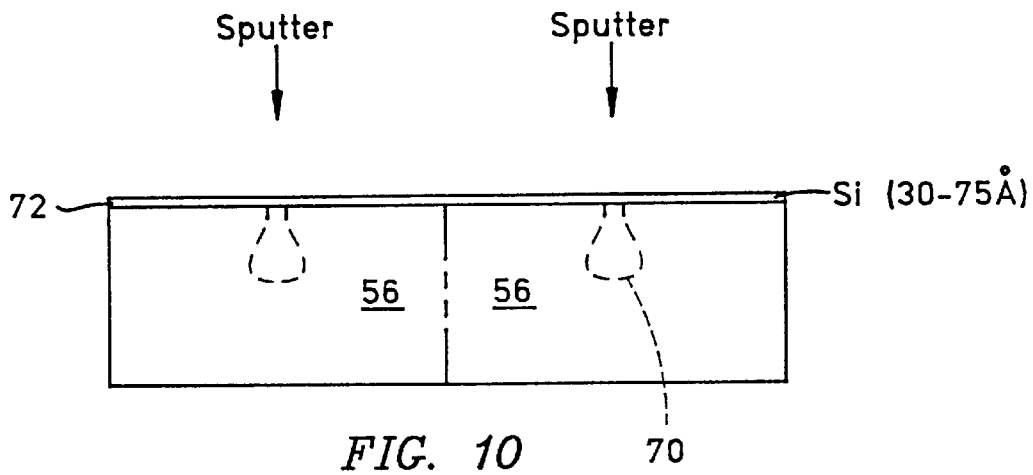
FIG. 10 is similar to FIG. 9, except it illustrates that a highly desirable wear coating can be formed from a single layer of silicon.
Figure 11:
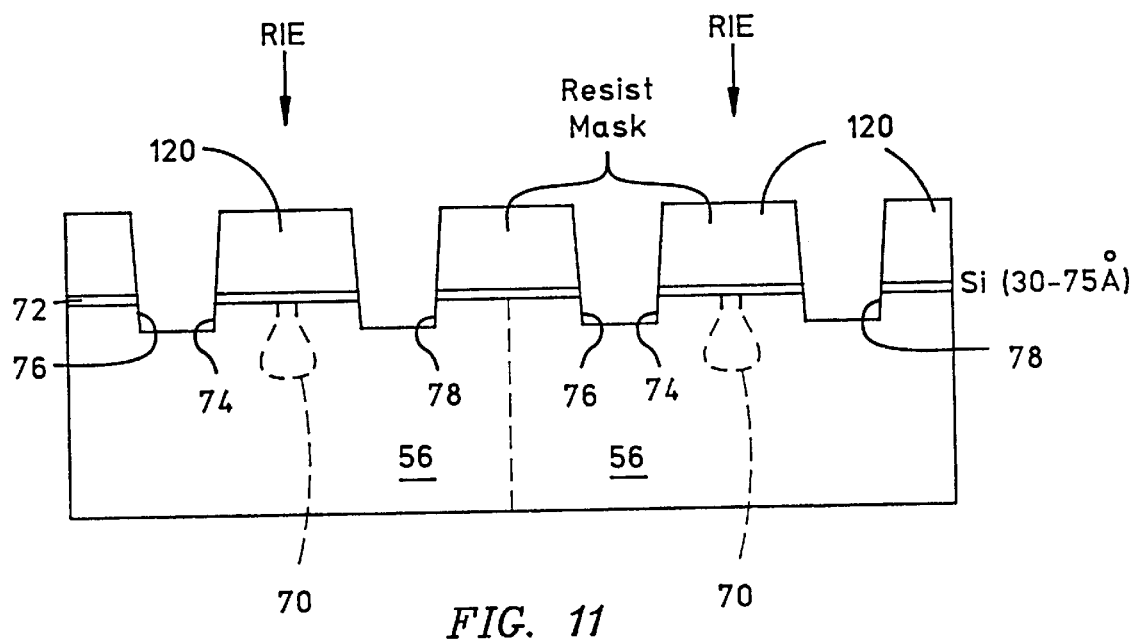
FIG. 11 shows process steps involved in patterning the row of magnetic head assemblies shown in FIG. 10.
Figure 12:
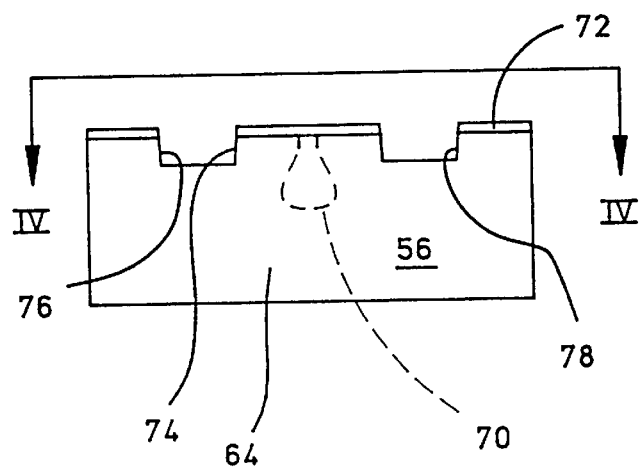
FIG. 12 shows a trailing edge view of a single magnetic head assembly after dicing the row of magnetic head assemblies shown in FIG. 11; the ABS view of the assembly being shown in FIG. 4 as taken along plane IV—IV.

FIGS. 6, 7 and 10–12 illustrate an exemplary method of making the present magnetic head assembly 44. FIG. 6 illustrates construction of magnetic head assemblies at the wafer level. FIGS. 7, 10 and 11 illustrate construction at the row level. FIG. 12 illustrates a single magnetic head assembly after construction that is identical to that shown in FIGS. 3–5. FIGS. 8 and 9 illustrate construction of magnetic head assemblies with multi-layer wear coatings.

In FIG. 6 a wafer substrate 100 is provided which is typically a mixture of alumina and titanium carbide ($Al_2O_3$/TiC). A plurality of thin film layers 102 are deposited on the wafer 100 for forming rows and columns of magnetic head assemblies 44. The wafer 100 and thin film layers 102 are then diced (cut) into rows of magnetic head assemblies, one row 104 being illustrated in FIG. 7. The ABS side of the row 104 is then lapped until the sensitive elements 71 have a predetermined height dimension for peak performance. After lapping, the ABS side of the row 104 is ready for deposition of a wear coating. A prior art wear coating 72 comprising three separate layers is formed in three deposition steps, as illustrated in FIG. 8. The first layer is a 10–50 Å thick adhesion layer of silicon. The next layer is a 50 Å thick layer of amorphous hydrogenated carbon and the final layer is a 50 Å thick layer of silicon. Another wear coating 72 is illustrated in FIG. 9 which employs only two layers. This results in less spacing loss than the prior art wear coating in FIG. 8 and requires one less deposition step. The wear coating 72 in FIG. 9 includes a 10 Å thick adhesion layer of silicon and a 35 Å thick layer of amorphous hydrogenated carbon. While the spacing loss has been minimized in the FIG. 9 embodiment, the additional deposition step increases manufacturing costs. It would be desirable to employ a single deposition step to form a single layer wear coating which has a performance comparable to that of the bi-layer wear coating shown in FIG. 9.

In FIG. 10, a single deposition step is employed for forming a single layer wear coating 72 which has wear characteristics comparable to that of the bi-layer wear coating shown in FIG. 9. This has been accomplished by sputtering a single layer of silicon based material 30–75 Å thick. The preferred sputtering is accomplished with a DC magnetron. This type of deposition results in a highly dense silicon based layer. In FIG. 11, a photoresist layer 120 has been formed on top of the wear coating 72 for the purpose of patterning the ABS with the rails 74, 76 and 78. The photoresist 120 protects the area where the rails are to be formed, and etching, such as reactive ion etching (RIE), is employed for forming the rails. In FIG. 12 the photoresist 120 has been dissolved in a solution leaving the center rail 74 between the two side rails 76 and 78. A view along plane IV—IV of FIG. 12 results in the view shown in FIG. 4.

Figure 13:
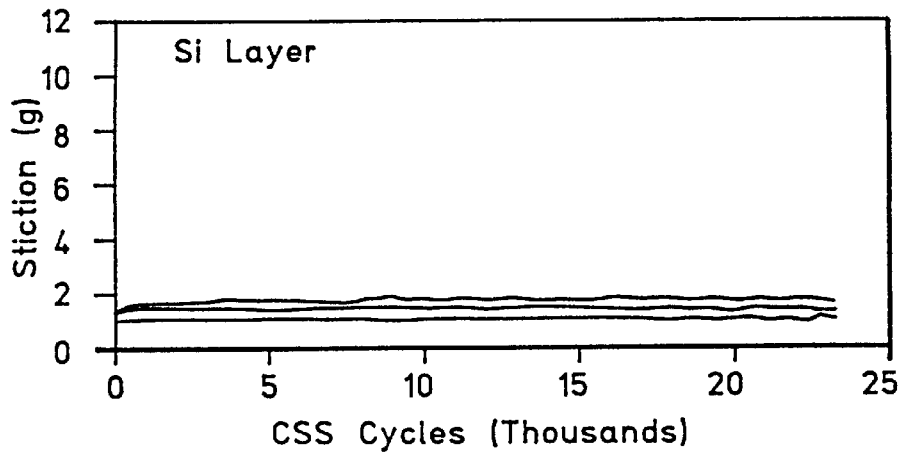
FIGS. 13 and 14 show the results of testing the present invention for stiction in grams versus CSS cycles in thousands.
Figure 14:
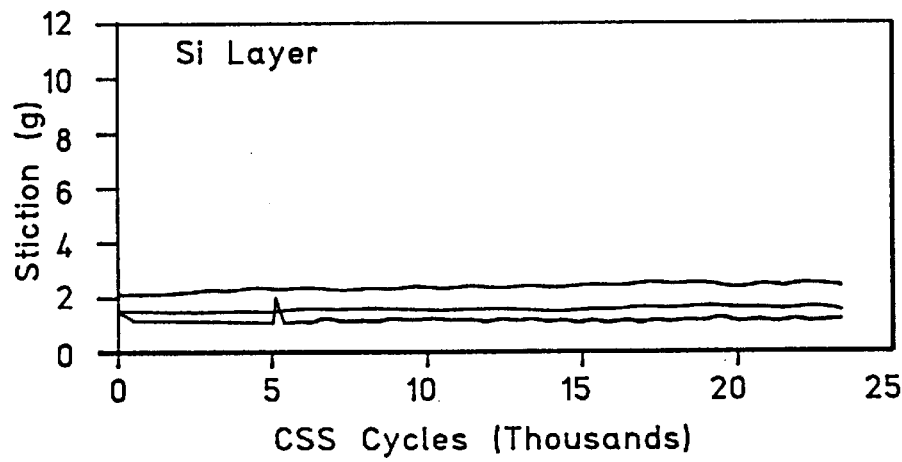
Figure 15:
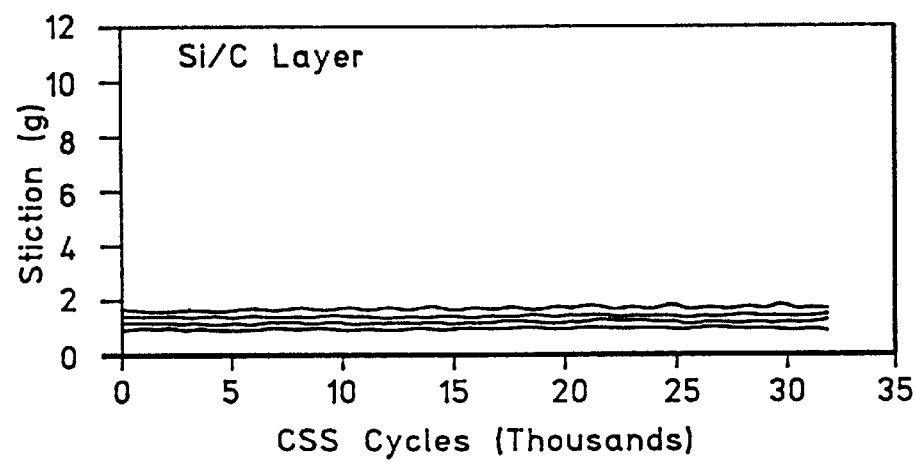
FIG. 15 is a chart illustrating the results of testing a bi-layer wear coating for stiction in grams versus CSS cycles in thousands.

FIGS. 14 and 15 are charts showing results of stiction in grams versus contact start and stop (CSS) cycles in thousands. Each of the charts in FIGS. 13 and 14 shows the results of testing three magnetic head assemblies having a single silicon layer wear coating with a thickness in the range of 30–75 Å. The single silicon layer wear coating was formed by sputtering pure silicon with a DC magnetron. Sputtering of a pure silicon layer is preferable to sputtering a silicon based layer. It can be seen from FIGS. 13 and 14 that after 20,000 cycles stiction generally remained constant at about two grams. FIG. 15 is a chart showing the results of testing the bi-layer wear coating comprising a 10 Å thick adhesion layer of silicon and a 35 Å thick layer of amorphous hydrogenated carbon. After 20,000 cycles, the stiction of the bi-layer wear coating remained generally constant at about two grams. Accordingly, the present invention can accomplish substantially the same results as the bi-layer wear coating with a single layer wear coating without increasing spacing loss.

Obviously, other embodiments and modmcau-ons of the mventi6oiwill occur to those of ordinary skill in the art in view of the above teachings. Therefore, the invention is to be limited only by the following claims which include all such embodiments and modifications when viewed in conjunction with the above specification and the accompanying drawings.

We claim:
1. A method of making a magnetic head assembly comprising the steps of:
   providing a slider with first and second surfaces, the first and second surfaces being bounded by leading and trailing edge surfaces and first and second side surfaces;
   forming a magnetic head adjacent the trailing edge surface of the slider, said magnetic head having at least one flux emanating and/or flux receiving a sensitive element at said first surface;
   forming a wear coating consisting of a single layer directly covering said first surface and the sensitive element for forming an air bearing surface; and
   said single layer being a layer of silicon or silicon-based material with a thickness in the range of 30 to 75 Å.
2. A method as claimed in claim 1 further including, after forming the single layer, patterning the first surface to provide the slider with at least one rail which is covered with at least a portion of the wear layer.
3. A method as claimed in claim 2 wherein the step of forming the single layer comprises sputtering silicon with a DC magnetron.
4. A method of making magnetic head assemblies comprising the steps of:
   providing a substrate of slider material;
   forming rows and columns of magnetic heads on said substrate;
   dicing the substrate and magnetic heads into rows of magnetic head assemblies on an elongated substrate portion of said substrate;
   lapping a row of magnetic heads on said elongated substrate portion to form a lapped surface which sizes one or more sensitive elements of each magnetic head;
   sputtering a single layer of substantially pure silicon directly onto the lapped surface;
   the single layer having a thickness in the range of 30–75 Å; and
   dicing the row of magnetic assemblies into individual magnetic head assemblies each including a slider.
5. A method as claimed in claim 4 wherein the step of sputtering the single layer includes sputtering said substantially pure silicon on said sensitive elements.
6. A method as claimed in claim 5 wherein after the step of sputtering the single layer, patterning the lapped surface to provide each slider with at least one rail which is covered with a portion of said single layer.
7. A method as claimed in claim 6 wherein the step of sputtering the single layer comprises sputtering with a DC magnetron.
8. A method as claimed in claim 7 wherein the substrate is $Al_2O_3TiC$.

* * * * *